(12) United States Patent
Rogers

(10) Patent No.: US 7,493,992 B2
(45) Date of Patent: Feb. 24, 2009

(54) GEARBOX BRAKE FOR MINING MACHINERY

(75) Inventor: Ralph F. Rogers, Sharon Center, OH (US)

(73) Assignee: PT Tech., Inc., Sharon Center, OH (US)

( * ) Notice: Subject to any disclaimer, the term of this patent is extended or adjusted under 35 U.S.C. 154(b) by 0 days.

(21) Appl. No.: 11/204,987

(22) Filed: Aug. 15, 2005

(65) Prior Publication Data

US 2007/0034458 A1 Feb. 15, 2007

(51) Int. Cl.
F16D 55/02 (2006.01)

(52) U.S. Cl. ............... 188/71.5; 188/170; 192/219.4; 180/343; 180/370

(58) Field of Classification Search ............. 188/170, 188/71.5, 71.6; 192/219.4–219.6, 225, 219.7; 74/411.5; 180/342, 343, 369, 370, 372
See application file for complete search history.

(56) References Cited

U.S. PATENT DOCUMENTS

| | | | | |
|---|---|---|---|---|
| 3,737,000 A | * | 6/1973 | Knobloch et al. | 180/369 |
| 3,770,074 A | * | 11/1973 | Sherman | 180/65.6 |
| 3,862,667 A | * | 1/1975 | Wolansky | 180/233 |
| 3,927,737 A | * | 12/1975 | Prillinger et al. | 188/106 F |
| 3,954,026 A | * | 5/1976 | Rittmann et al. | 74/411.5 |
| 4,037,694 A | * | 7/1977 | Keese | 192/221.1 |
| 4,649,772 A | * | 3/1987 | Daniel et al. | 475/331 |
| 4,739,852 A | * | 4/1988 | Stevens et al. | 180/9.62 |
| 4,799,564 A | * | 1/1989 | Iijima et al. | 180/65.5 |
| 4,947,966 A | * | 8/1990 | Huff | 188/170 |
| 5,050,710 A | * | 9/1991 | Bargfrede | 188/71.6 |
| 5,088,967 A | * | 2/1992 | Opitz et al. | 475/107 |
| 6,458,057 B2 | * | 10/2002 | Massaccesi et al. | 475/302 |
| 6,537,167 B1 | * | 3/2003 | Gazyakan et al. | 475/5 |
| 6,672,985 B2 | * | 1/2004 | Chung et al. | 475/221 |

* cited by examiner

Primary Examiner—Christopher P Schwartz
(74) Attorney, Agent, or Firm—Renner, Kenner, Greive, Bobak, Taylor & Weber

(57) ABSTRACT

A gearbox having an integral wet brake assembly is provided to replace the prior gearbox assembly of an underground mining machine. The brake housing is configured and contoured to be nestingly received upon the gearbox housing and without intrusion upon the output drive flanges. The brake housing includes concentric parking and service brake pistons adapted to engage and disengage a brake disc stack provided within a cavity machined into an end plate of the gear box assembly. An intermediate shaft of the gearbox is provided with a hub to engage the rotary discs of the brake disc stack. The parking brake is normally engaged by a spring and released by hydraulic pressure, while the service brake is normally released by a spring and engaged by hydraulic pressure.

20 Claims, 4 Drawing Sheets

GEARBOX BRAKE FOR MINING MACHINERY

TECHNICAL FIELD

The invention herein resides in the art of power transmission devices and, more particularly, to a gearbox brake combination for use on underground mining machinery. Particularly, the invention relates to a wet brake adapted for use on the intermediate shaft of the gearbox having a two stage helical gear parallel shaft reduction. Specifically, the invention relates to a gearbox having a wet brake on the intermediate shaft and a method for adapting a wet brake to a gearbox for replacement of an existing gearbox.

BACKGROUND OF THE INVENTION

For nearly a half century, articulated four-wheel drive vehicles have been widely used in the underground mining industry. This type of vehicle configuration is common for scoops, shield haulers and the like. The front section of such vehicles contains a driven axle and the particular attachment (scoop, fork, etc.) and the rear section houses the drive system for the vehicle, its hydraulics, controls, batteries and the like. To an extent, the vehicle is like a compact articulated front end loader commonly used in the construction industry, but with significantly reduced height.

As with all underground mining machinery, space is at a significant premium. The drive system of these vehicles normally consists of an electric motor with a pinion gear on its output shaft that plugs into a gearbox with a two stage helical gear parallel shaft reduction. The first stage is typically a fixed reduction to accommodate the motor pinion gear. The second stage reduction is tailored to accommodate the needs of different sizes and capacities of vehicles. The output shaft is typically double extended to both sides with universal joint flanges on each side. One side drives the front pair of wheels and the other side drives the rear wheels.

When this equipment was first designed, a disc was secured to one of the universal joint flanges and a mating caliper was secured to a built in pad on the gearbox to create a cost efficient dry caliper disc brake.

However, dry caliper disc brakes are generally not preferred in rigorous mining conditions and they have also lost favor due to changes in governmental regulations. Wet disc brakes then were adapted to fit the universal joint and the existing gearbox caliper pad. While these brakes performed much better than the dry caliper brakes, they were large, complicated in design, difficult to seal, difficult to replace, costly, and with a torque setting that typically required modification to accommodate different gear ratios. U.S. Pat. No. 6,260,668 is an attempt to resolve this problem, but in a significantly different manner than that presented herein.

There remains a need in the art for a wet brake and gearbox combination that will fit into the space accommodating the gearbox presently employed. It is most desirable that a wet brake be positionable between the motor and double extended output shaft of the gearboxes in issue. Heretofore, the art has been incapable of such packaging in a durable, reliable, and cost efficient manner.

DISCLOSURE OF THE INVENTION

In light of the foregoing, it is a first aspect of the invention to provide a wet disc brake as an integral part of a gearbox for use with underground mining machinery.

It is another aspect of the invention to provide a wet disc brake mounted to the intermediate shaft of the reducer of gearboxes of the type presently used for underground mining machinery.

Yet a further aspect of the invention is the provision of a wet disc brake that can be adapted to replace existing gearboxes for underground mining machinery by employing the same mounting structures, but without adversely increasing the envelope of the gearbox and while providing ease of serviceability.

Still a further aspect of the invention is the provision of a method for configuring a gearbox for underground mining machinery to receive a wet disc brake operating upon the intermediate shaft of the gearbox, and to do so in a cost effective manner.

Still a further aspect of the invention is the provision of a wet disc brake for a gearbox of underground mining machinery and the method for implementing the same, which is reliable, durable, cost effective, and given to ease of service.

The foregoing and other aspects of the invention which will become apparent as the detailed description proceeds are achieved by the improvement of a brake in a gearbox for underground mining machinery having a gearbox housing and a motor driven input driving a two stage helical gear parallel shaft reduction comprising a first intermediate shaft and a second output shaft, the output shaft having an output hub thereon, the improvement comprising: a brake housing secured to the gearbox housing and forming a cavity therewith, said cavity receiving an end of the intermediate shaft; at least one brake disc received by the end of the intermediate shaft within said cavity; and a first brake piston received within said cavity in selective operative engagement with said brake disc to inhibit rotation of the intermediate shaft.

Other aspects of the invention are attained by a method for adapting a wet brake to the intermediate shaft of a gearbox having a gearbox housing and a motor driven pinion input driving a two stage helical gear parallel shaft reduction, comprising the first intermediate shaft and a second output shaft, the output shaft having an output hub thereon, the method comprising the steps of: (a) forming a brake cavity between the gearbox and a brake housing; (b) providing a brake disc stack within said brake cavity; (c) providing at least one actuating piston in said brake cavity; (d) operatively interconnecting said brake disc stack between said brake housing and said intermediate shaft within said brake cavity; and (e) sealingly securing said brake housing to the gearbox housing effect operative engagement between said brake disc stack and said actuating piston.

BRIEF DESCRIPTION OF DRAWINGS

For a complete understanding of the aspects, techniques and apparatus of the invention, reference should be made to the following detailed description and accompanying drawings wherein.

BEST MODE FOR CARRYING OUT THE INVENTION

Figure 1:
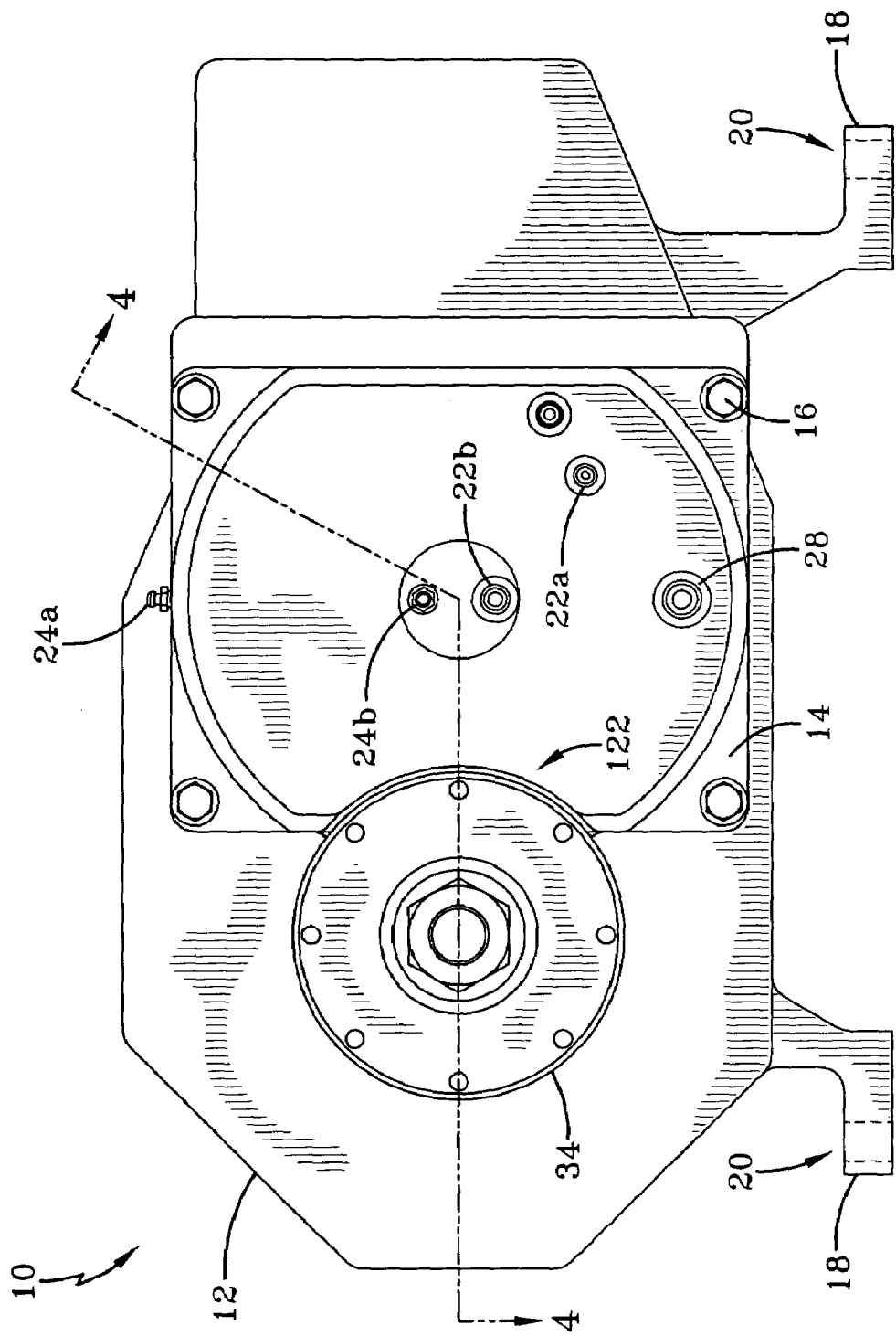
FIG. 1 is front elevational view of the gearbox and brake assembly for mining machinery made in accordance with the invention.
Figure 2:
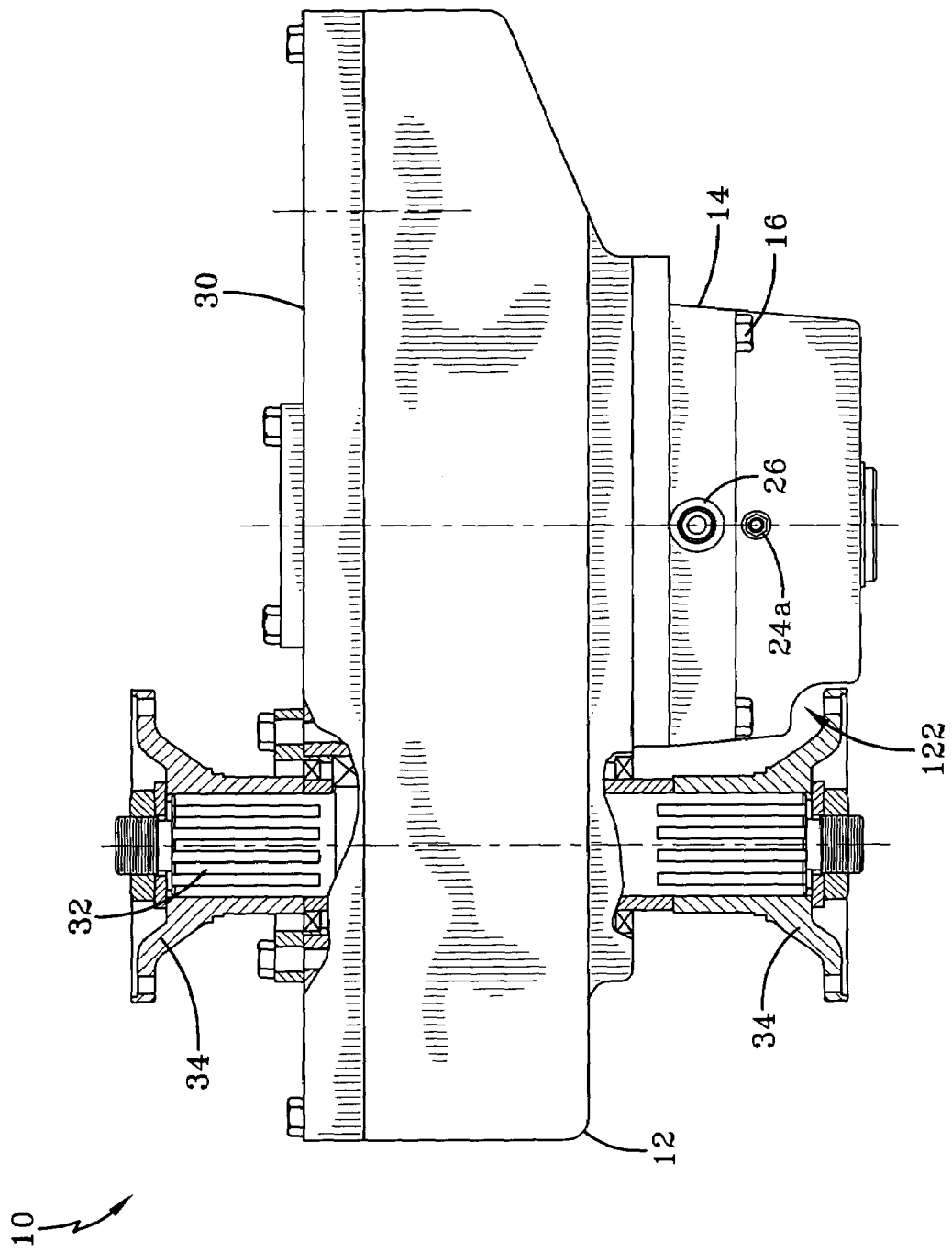
FIG. 2 is a top plan view of the assembly of FIG. 1.

Referring now to the drawings and more particularly FIGS. 1 and 2, it can be seen that a gearbox and brake assembly made in accordance with the invention is designated generally by the numeral 10. The gear housing 12 is configured to receive a brake housing 14 attached thereto by bolts 16 or other appropriate means. The gearbox assembly is provided with a pair of feet or pads 18 for receipt of mating bolts through bores 20. The bores 20 are nominally 20.63 inches on centers, with the housing 12 having height of 16 inches measured from the bottom of the feet 18 to the top of the housing 12. The center lines of the output shaft and the intermediate shaft to which the brake assembly is attached lie along a center line nominally 9 inches from the bottom of the pad 18. This positioning and spacing is consistent with the prior art gearbox assembly to be replaced by the assembly 10.

As a portion of the instant invention, actuation port nipples 22a and 22b and bleeder port nipples 24a and 24b are provided in the housing 14 for the hydraulic actuating/control fluids for the service and parking brakes, respectively, as will be described herein. Similarly, a fill port 26 and a drain port 28 is provided for receiving and draining the coolant employed by the wet brake of the invention.

A motor mount surface 30 is provided on a rear portion of the gearbox housing 12 as shown in FIG. 2 to receive the motor used for driving the gearbox of the prior art. The motor provides the driving force to a two stage helical gear parallel shaft reduction to the output shaft 32, which is dual ended and splined to receive output hubs 34 having universal joint flanges.

Figure 3:
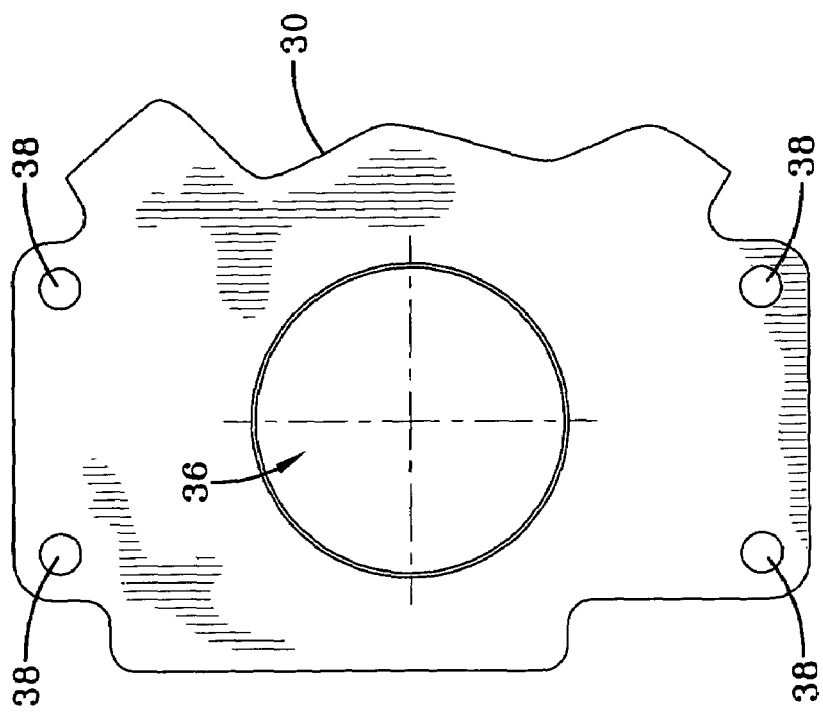
FIG. 3 is a front elevational view of the motor mounting face detail of the gearbox assembly.

As shown in FIG. 3, the motor mount surface 30 includes a pilot bore 36 for receiving the drive motor shaft with associated pinion gear, and a plurality of threaded bores 38, to which the motor is mounted. To accommodate the prior art motor, the pilot bore 36 has a nominal diameter of 6 inches, while the mounting bolt bores 38 are spaced 5.12 and 13.37 inches apart.

Figure 4:
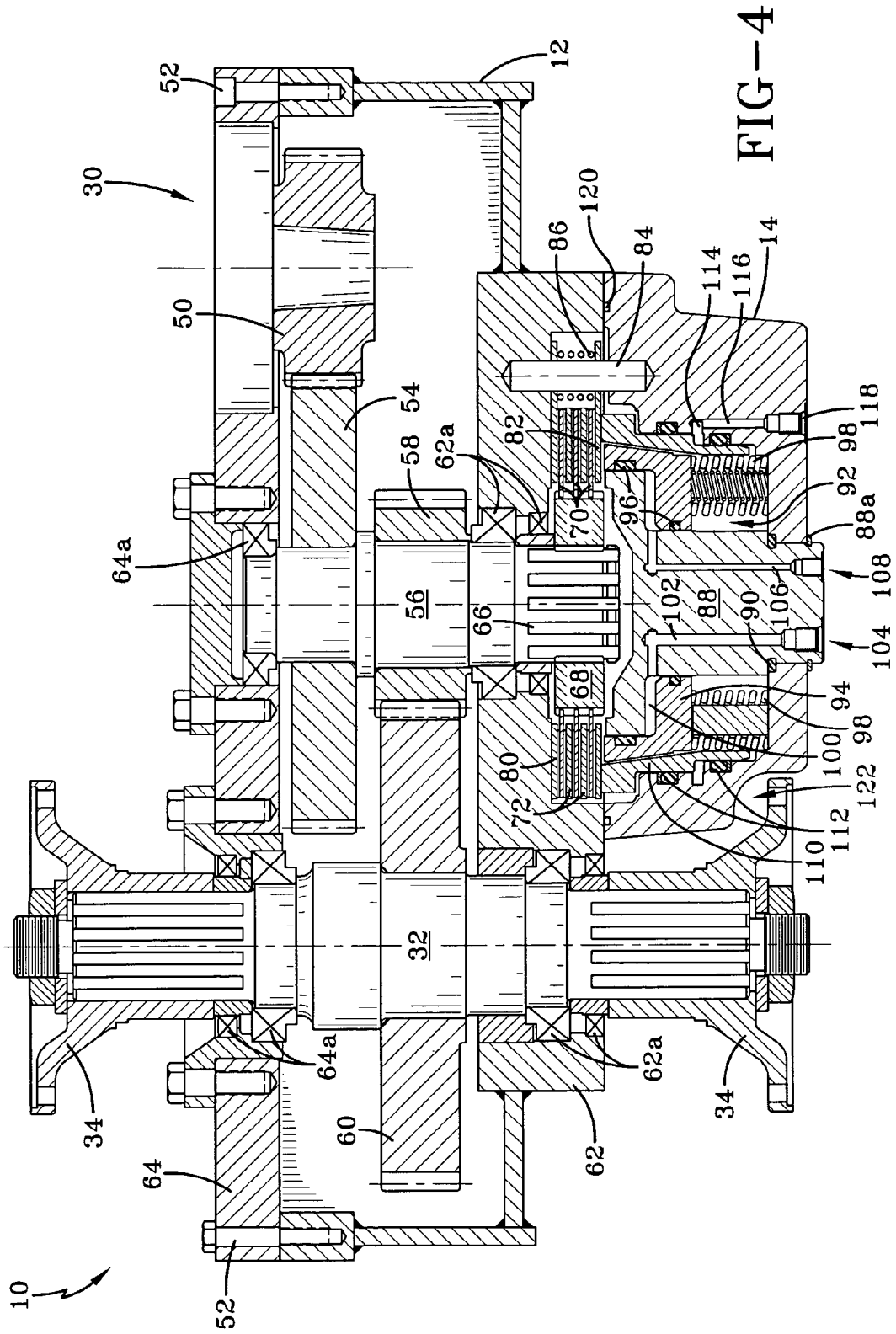
FIG. 4 is a cross sectional view of the assembly of FIG. 1 taken along the line 4-4.

With reference now to FIG. 4, an appreciation can be obtained of the operational structure of the wet brake of the invention and its adaptation to the a gearbox for replacement of prior gearbox assemblies. As shown, power input is through a pinion gear 50 that is positioned to mate with a drive motor (not shown) secured to the gear housing 12 through appropriate bolts. The pinion gear 50 drives a drive gear 54 mounted on an intermediate shaft 56 having a gear reducer 58 mounted thereon for engagement with the drive gear 60 on the output shaft 32. As shown, the output shaft 32 has fore and aft output hubs 34 attached thereto, each having an appropriate universal flange. The gear housing 12 primarily comprises end plates 62, 64 interconnected by appropriate side members, the end plate 62 being secured to the side members by bolts 52. As shown, the end plates 62, 64 are machined to receive the output shaft 32 and intermediate shaft 56 within appropriate bearings 62a, 64a. It will be appreciated that the end plates 62, 64 and side members might be replaced with a cast housing or the like.

According to the invention, the end plate 62 is machined to receive a parking and service brake (to be described) on the intermediate shaft 56, which is also configured to receive a hub to drive the rotors of a brake disc stack of the brake. It will be appreciated that the intermediate shaft of the prior art was not splined, nor in any way adapted to engage a brake. A key to the invention herein, which adds a wet parking and service brake to the intermediate shaft 56, is the configuration of the housings 12, 14 to provide for a wet disc brake on the intermediate shaft 56, while being capable of direct replacement for the prior art gearboxs. Indeed, the housing 14 is configured so that it avoids the proximate output hub 34 while extending substantially coplanar therewith, and the housing 12 is machined to receive the brake disc stack.

As shown in FIG. 4, splines 66 are provided on the end of the intermediate shaft 56 to receive and maintain a hub 68 thereon. Friction discs 70 are splined to the hub 68, and serve as the rotor discs of a brake disk stack. The stator or separator discs 72 are appropriately pinned to either the end plate 62 or the brake housing 14. The rotor and stator discs 70, 72 comprise a brake disc stack, maintained in a cooling fluid to constitute a wet brake.

Figure 5:
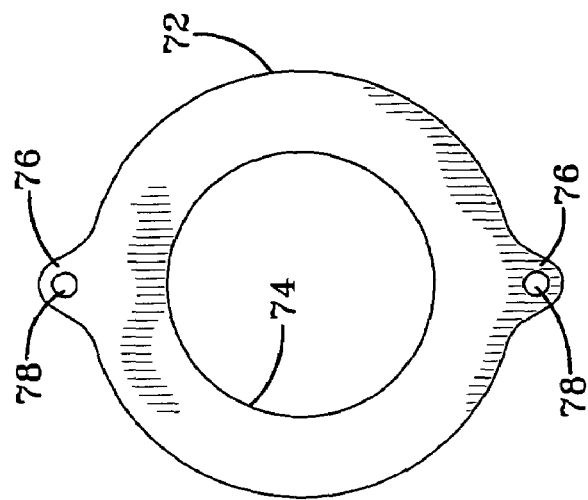
FIG. 5 is a front elevational view of a stator or separator disc used in the brake disc stack of the invention.

As shown in FIG. 5, the stator discs 72 comprise annular discs having an aperture 74 for the hub 68 to pass through. A pair of ears 76 extend in diametric opposition from the outer circumferential edge of the disc 72 with through bores 78 provided therein for the receipt of pins for pinning and securing the stator discs 72 to either the end plate 62 or the brake housing 14, as desired. The configuration shown in FIG. 5 allows the separator disc to have a maximum operable surface within the circular confines of the disc, the pinning being achieved outside of the rubbing area.

The brake disc stack 70, 72 is sandwiched between a back plate 80 and a pressure plate 82. The back plate 80 rests upon an end wall of a cavity within the end plate 60, while the pressure plate 82 is positioned on an opposite side of the stack 70, 72. The back plate 80 and pressure plate 82 are pinned between the end plate 62 and brake housing 14 by an appropriate pin 84. A spring 86 is maintained about the pin 84 and interposed between the back plate 80 and pressure plate 82 to urge the two plates apart, to relieve engagement of the rotor and stator discs 70, 72. Those skilled in the art will appreciate that the spring 86 urges the brake disc stack 70, 72 into disengagement.

A brake housing hub 88 is received within an annular bore of the brake housing 14 and secured thereto by an appropriate keeper ring 88a. A seal 90 is also provided at the interface of the brake housing 14 and hub 88.

A cavity 92 is defined between the housing 14 and hub 88, and communicates with the cavity receiving the brake disc stack 70, 72 within the end plate 62. Received within the cavity 92 between the brake housing assembly 14, 88 is a piston 94, which serves as the parking brake piston in the context of the instant invention. Seals 96 are interposed between the parking brake piston 94 and the hub 88. Springs 98 are received within the cavity 92 and are interposed between the brake housing 14 and the parking brake piston 94 to urge the piston 94 against the pressure plate 82 to achieve locking engagement with the intermediate shaft 56. Accordingly, and in accordance with the preferred embodiment of the invention, the springs 98 force the piston 94 against the brake disc stack for a normally engaged condition.

A parking brake cavity 100 is defined between the hub 88 and the piston 94, and axially between the seals 96. Pressurized hydraulic fluid is introduced into the cavity 100 through the bore 102 from the input 104 (communicating with nipple 22b of FIG. 1) to urge the piston 94 against the springs 98 to release the parking brake activity, as will be readily appreciated by those skilled in the art. Typically, the input 104 will be controlled by a hand lever accessible by the operator. The parking brake hydraulic system may be bled through a bleeder bore 106 and a bleeder output 108 (communicating with nipple 24b of FIG. 1) to remove air or the like that might otherwise be introduced into the cavity 100.

Also provided as a part of the intermediate shaft brake of the invention is a service brake piston 110, concentrically arranged with the parking brake piston 94 and received within the cavity 92. Seals 112 are interposed between the piston 110 and the brake housing 14, with a service brake actuation cavity 114 interposed therebetween. A hydraulic bore 116 communicates with an inlet 118 (communicating with nipple 22a of FIG. 1) for the application of pressurized hydraulic fluid into the cavity 114 for actuation of the service brake piston 110. An appropriate bleeder path (not shown) passes from the cavity 114 to nipple 24 of FIG. 1. Those skilled in the art will appreciate that pressurized hydraulic fluid within the cavity 114 urges the service brake piston 110 against the pressure plate 82 to achieve engagement of the brake disc stack 70, 72. When the hydraulic pressure is released, the spring 86 urges separation of the pressure plate 82 and back plate 80 to disengage the brake. In the preferred embodiment, the service brake fluid input 118 is pedal actuated by an operator.

A seal 120 is interposed between the brake housing 14 and end plate 62, as shown. Moreover, in order to maintain the compact nature of the assembly 10, the brake housing 14 is machined out to define a relief area 122 to nestingly receive the universal flange of the proximate output hub 34.

In operation, the parking brake is normally engaged through the springs 98 urging the parking brake piston 94 into forceful contacting engagement with the pressure plate 82. The parking brake is disengaged by hand lever actuation of hydraulic fluid pressure through the input 104, bore 102 and cavity 100 as described above. With the parking brake released, the intermediate shaft 56 is free to rotate and, accordingly, operation of the gearbox is enabled. During operation, the service brake may be employed to stop or impede the transfer of power from the motor driven pinion gear 50 to the output shaft 32 by the application of braking force by the service brake piston 110 upon the pressure plate 82. Brake pedal actuation introduces pressurized hydraulic fluid through the input 118, bore 116 and into the cavity 114 for such actuation. Upon release of the hydraulic pressure, the return spring 116 urges return of the piston 110 by separating movement of the pressure plate 82 and disengagement of the discs 70, 72. By braking the intermediate shaft 56, the amount of torque or force required for the necessary braking operation is significantly reduced from that which would be required upon the output shaft 32 as practiced in the prior art.

Thus it can be seen that the aspects of the invention have been satisfied by the structure presented above. While in accordance with the patent statutes only the best mode and preferred embodiment of the invention has been presented and described in detail, the invention is not limited thereto or thereby. Accordingly, for an appreciation of the scope and breadth of the invention reference should be made to the following claims.

What is claimed is:

1. In a central gearbox for underground mining machinery, the central gearbox driving and braking all of the driven wheels of the machinery, the central gearbox having a gearbox housing and a motor driven pinion driving a two stage helical gear parallel shaft reduction comprising a first intermediate shaft and a second output shaft, the output shaft having an output hub thereon, the improvement of a brake, comprising:
   a brake housing secured to the gearbox housing and forming a cavity therewith, said cavity receiving an end of the intermediate shaft;
   at least one brake disc received by the end of the intermediate shaft within said cavity; and
   a first brake piston received within said cavity in selective operative engagement with said brake disc to inhibit rotation of the intermediate shaft.

2. The improvement in a gearbox according to claim 1, further comprising
   a second brake piston, received within said cavity and concentric with said first brake piston, in selective operative engagement with said brake disc to inhibit rotation of the intermediate shaft.

3. The improvement in a gearbox according to claim 2, wherein said first brake piston is urged toward engagement with said brake disc by a spring.

4. The improvement in a gearbox according to claim 3, wherein said first brake piston is urged from engagement with said brake disc by hydraulic pressure introduced into a return cavity between said brake housing and said first brake piston.

5. The improvement in a gearbox according to claim 2, wherein said second brake piston is urged into engagement with said brake disk by hydraulic pressure introduced into an application cavity between said brake housing and said second brake piston.

6. The improvement in a gearbox according to claim 5, further comprising a return spring in operative engagement with said second brake piston and urging said second brake piston out of engagement with said brake disc.

7. The improvement in a gearbox according to claim 2, wherein said brake disc is a part of a disc stack having rotors operatively connected to the intermediate shaft, and stators operatively connected to said brake housing.

8. The improvement in a gearbox according to claim 7, wherein said stator comprises an annular disc having ears extending from an outer circumferential surface thereof, said ears having apertures for receiving pins for operatively securing said stator to said brake housing.

9. The improvement in a gearbox according to claim 7, wherein said disc stack is maintained in a fluid bath, comprising a wet brake, said brake housing being sealed against said end plate and said first brake piston and said second brake piston being sealed against said brake housing.

10. The improvement in a gearbox according to claim 7, wherein said brake housing comprises an outer annular shell receiving a central hub sealed and secured thereto.

11. The improvement in a gearbox according to claim 10, wherein said brake housing has a relief area receiving the output hub.

12. A method for adapting a wet brake to the intermediate shaft of a gearbox for underground mining machinery, the central gearbox driving and braking all of the driven wheels of the machinery, the central gearbox having a gearbox housing and a motor driven pinion input driving a two stage helical gear parallel shaft reduction comprising the first intermediate shaft and a second output shaft, the output shaft having an output hub thereon, the method comprising the steps of:
   (a) forming a brake cavity between the gearbox housing and a brake housing;
   (b) providing a brake disc stack within said brake cavity;
   (c) providing at least one actuating piston in said brake cavity;
   (d) operatively interconnecting said brake disc stack between said brake housing and said intermediate shaft within said brake cavity; and
   (e) sealingly securing said brake housing to the gearbox housing to effect operative engagement between said brake disc stack and said actuating piston.

13. The method according to claim 12, wherein said brake housing is configured asymmetrically to receive the output hub of the output shaft.

14. The method according to claim 12, wherein said step of providing at least one actuating piston comprises the provision of a parking brake piston and a service brake piston concentrically received within said brake cavity.

15. The method according to claim 14, further comprising the step of providing a first spring within said brake cavity in contacting engagement with said parking brake piston and urging said parking brake piston toward said brake disc stack.

16. The method according to claim 15, further comprising the step of configuring a hydraulic return cavity between said parking brake piston and said brake housing.

17. The method according to claim 16, further comprising the step of configuring a hydraulic actuating cavity between said service brake piston and said brake housing.

18. The method according to claim 17, further comprising the step of providing a return spring within the gearbox housing and in operative engagement with said brake disc stack.

19. The method according to claim 18, wherein said brake cavity is formed by forming a first cavity in the gearbox housing and a second cavity in the brake housing, said first and second cavities being in alignment when the brake housing is sealingly secure to the gearbox housing.

20. The method according to claim 12 further comprising the step of providing intermediate shaft splines for receiving said brake disc stack.

* * * * *